Figure 1:
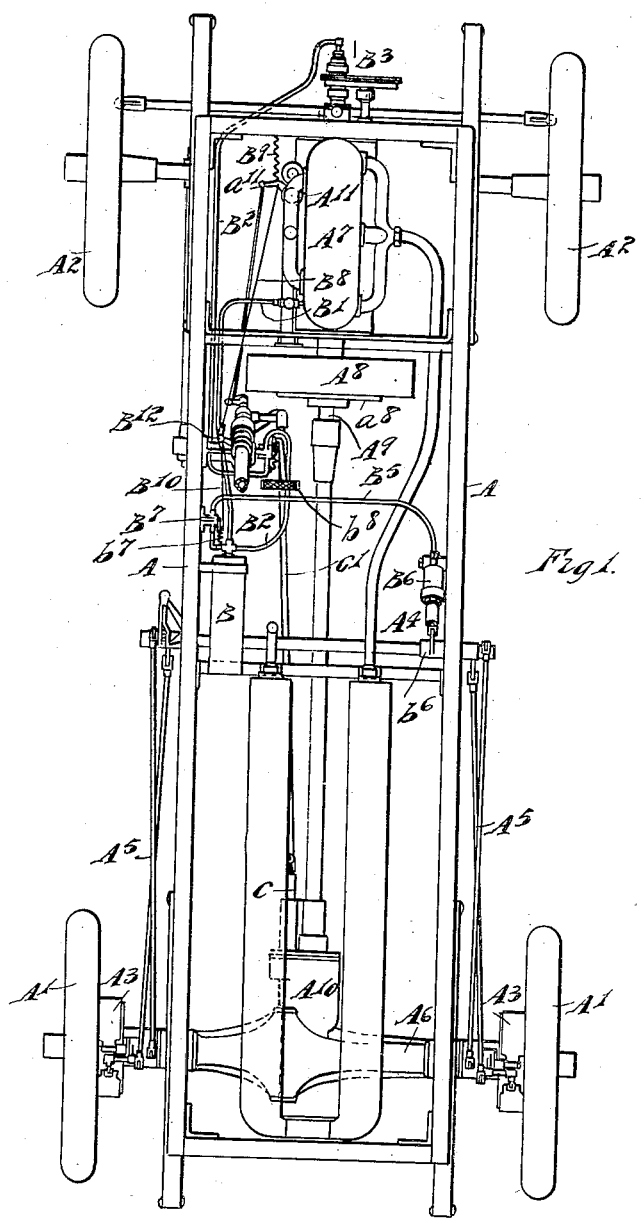

No. 890,565. PATENTED JUNE 9, 1908.
C. B. KING.
CHANGE SPEED AND REVERSING GEAR.
APPLICATION FILED APR. 3, 1905.

4 SHEETS—SHEET 1.

WITNESSES
Lotta Lee Hayton.
C. F. Day.

INVENTOR
Charles B. King.
By
Parker & Burton, Attorneys.

No. 890,565. PATENTED JUNE 9, 1908.
C. B. KING.
CHANGE SPEED AND REVERSING GEAR.
APPLICATION FILED APR. 3, 1905.
4 SHEETS—SHEET 2.
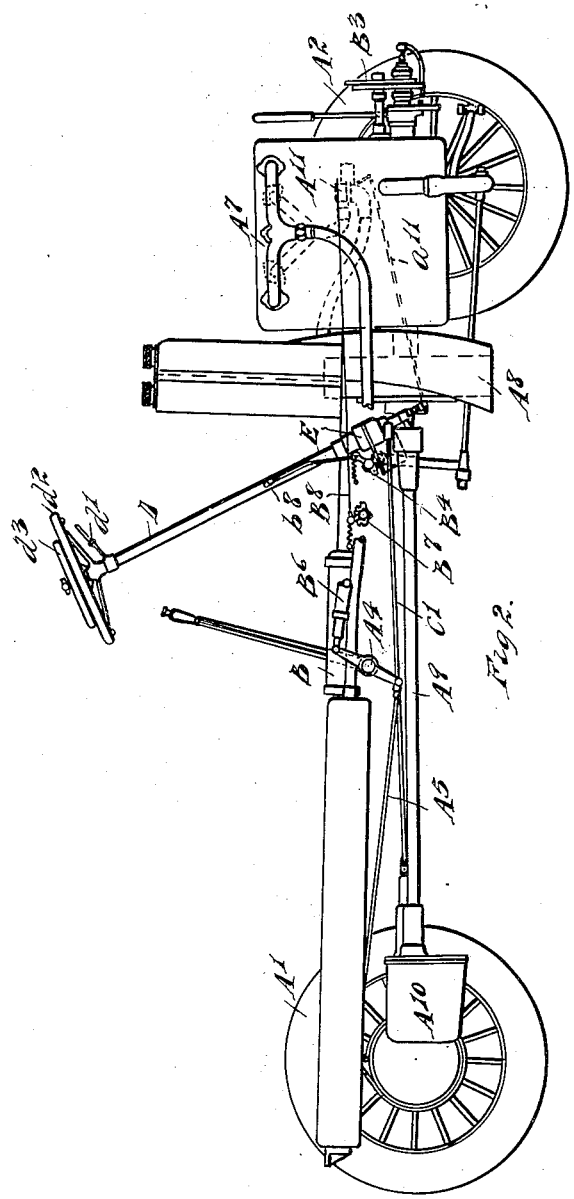
WITNESSES
INVENTOR
Charles B. King
By Parker & Burton
Attorneys.

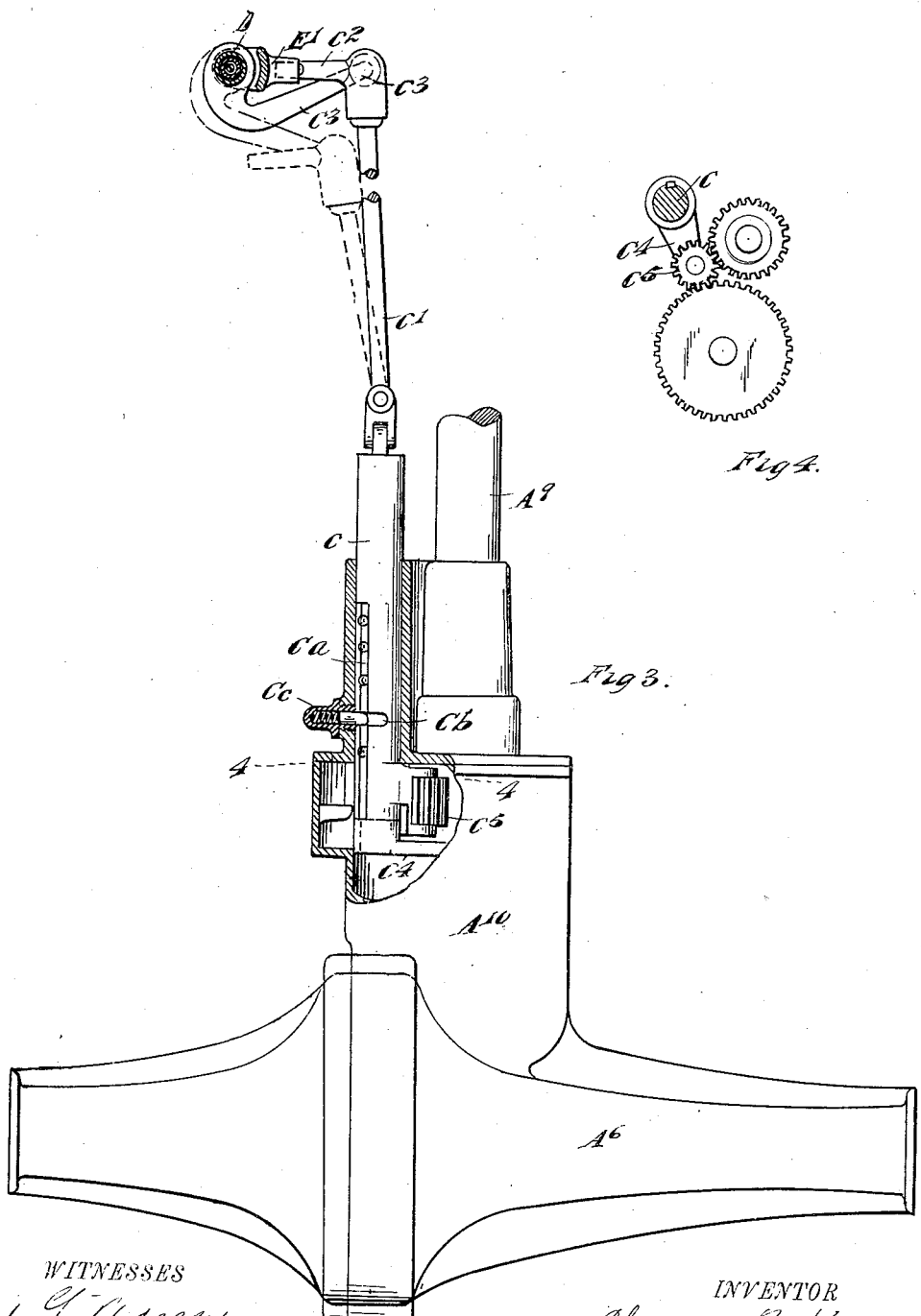

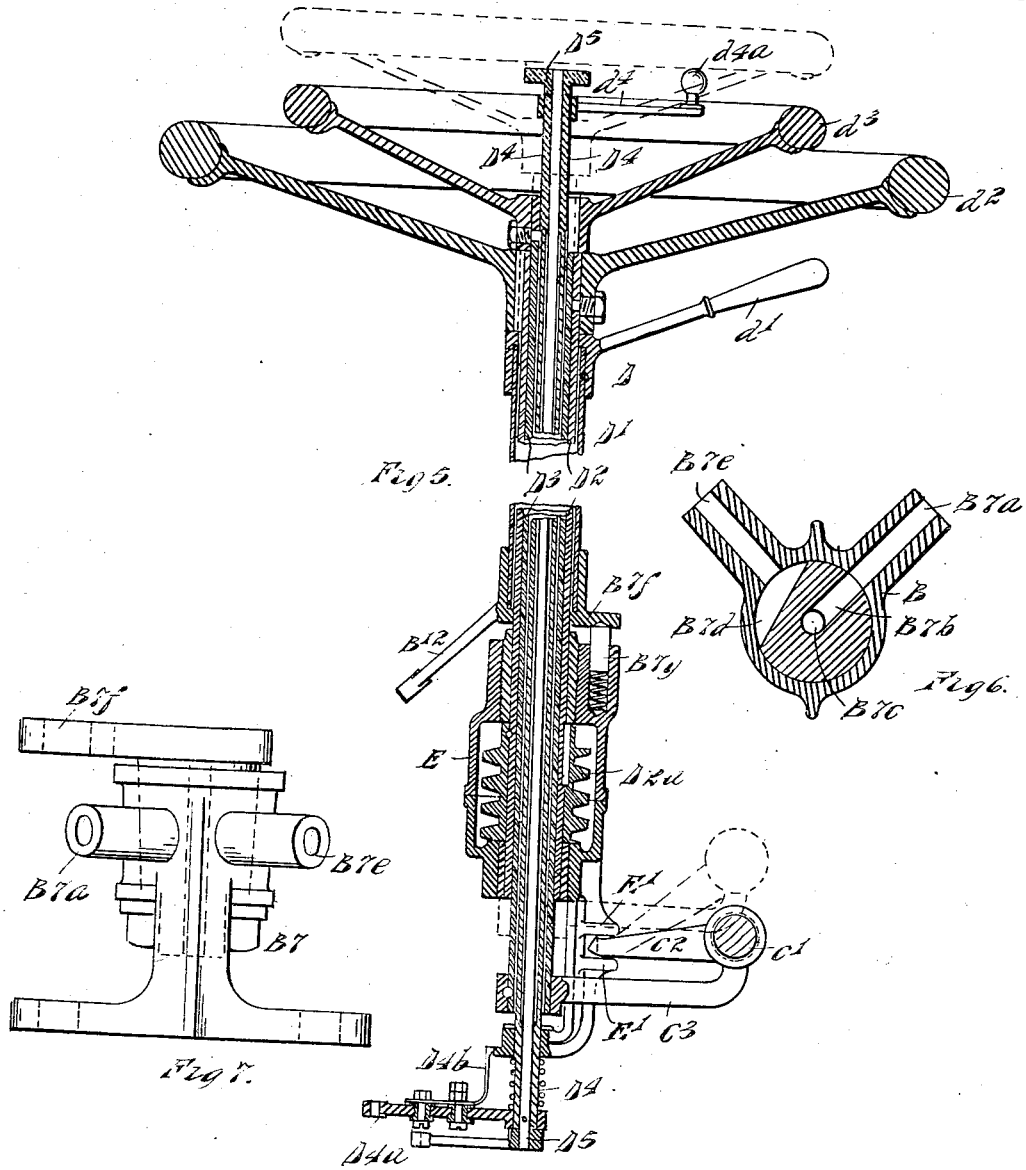

UNITED STATES PATENT OFFICE.

CHARLES B. KING, OF DETROIT, MICHIGAN, ASSIGNOR TO NORTHERN MOTOR CAR COMPANY, OF DETROIT, MICHIGAN, A CORPORATION OF MICHIGAN.

CHANGE-SPEED AND REVERSING GEAR.

No. 890,565.  Specification of Letters Patent.  Patented June 9, 1908.

Application filed April 3, 1905. Serial No. 253,585.

*To all whom it may concern:*

Be it known that I, CHARLES B. KING, a citizen of the United States, residing at Detroit, county of Wayne, State of Michigan, have invented a certain new and useful Improvement in Change-Speed and Reversing Gears, and declare the following to be a full, clear, and exact description of the same, such as will enable others skilled in the art to which it pertains to make and use the same, reference being had to the accompanying drawings, which form a part of this specification.

This invention relates to automobiles, and the object of my improvements is to provide an improved apparatus for controlling the motion of the same.

In the drawings:—Figure 1, is a plan view of the chassis of an automobile embodying my invention. Fig. 2, is a side view of the same. Fig. 3, is an enlarged detail plan view, partly in section, of the steering post, the change-speed gear casing and connecting parts. Fig. 4, is a diagrammatic view of a portion of the reversing mechanism lying adjacent to the line 4—4 of Fig. 3. Fig. 5, is an enlarged sectional view of the steering post and adjacent parts. Figs. 6 and 7 are respectively a sectional view and an elevation of a controlling valve.

A, is the frame; $A^1$, the rear wheels and $A^2$, the front wheels of an automobile.

$A^3$, $A^3$, indicate the brakes on the rear wheels.

$A^4$, is a shaft pivoted in bearings on the frame, and connected by rods $A^5$, $A^5$, with the operative parts of the brakes $A^3$, $A^3$, so that said brakes may be set or released by turning said shaft.

$A^6$, is the case or sleeve for the rear axle.

$A^7$, is a gas engine mounted upon the frame A.

$A^8$, is the fly-wheel and $a^8$, is a clutch.

$A^9$, is the transmission shaft and $A^{10}$, is the casing surrounding the change speed gearing.

B, is a reservoir for compressed gases. This reservoir is connected by a pipe $B^1$ with one of the cylinders of the gas engine so that gases under pressure in said cylinder shall flow into said reservoir and maintain the pressure therein. $B^2$, is a pipe leading from the reservoir and connected at $B^3$, with apparatus for controlling the clutch $A^8$.

$B^4$, is a valve of the kind illustrated in Figs. 6 and 7, said valve is located in the pipe $B^2$ and is adapted to control the pressure in clutch operating apparatus. The valve $B^4$ is operated by means of a foot lever $b^8$.

$B^5$, is a pipe leading from the reservoir B and communicating with the cylinder of a pneumatic apparatus $B^6$ by which when the pressure is permitted to pass through said pipe, the shaft $A^4$ is rotated to set the brakes $A^3$, $A^3$.

$B^7$, is a control valve of the kind shown in Figs. 6 and 7.

Referring to Fig. 6, $B^{7a}$, is a passage leading to the place of application of the compressed gases, and $B^{7e}$ is the passage leading from the reservoir.

$B^{7c}$, is a central opening to the outer air.

$B^{7b}$, is a radial passage opening to the passage $B^{7c}$.

$B^{7d}$, is a slot in the plug. The passage $B^{7d}$ may be turned to connect the passages $B^{7e}$ and $B^{7a}$ to apply the brake or clutch.

$B^{7b}$, may be turned to exhaust the compressed gases from the passage $B^{7a}$, or the plug can be turned to a neutral position.

$b^7$, is a spring keeping the valve $B^7$ normally closed.

$A^{11}$, is the carbureter, and $a^{11}$, is the lever by which the opening through the carbureter may be regulated.

$B^9$, is a spring by which the lever $a^{11}$ is drawn to a position at which the passage through the carbureter is nearly closed.

$B^{12}$, is an arm pivoted upon the steering post.

$B^8$, is a flexible connection, as a wire, between the arms $B^{12}$ and $a^{11}$. $B^{10}$, is a like connection between said lever arm and the controlling lever of the valve $B^7$.

C, (Fig. 3) is a rod adapted to slide in a sleeve in the change-speed gear case $A^{10}$, to shift the gear wheels to obtain the different ratios of speed.

$C^1$, is a rod having one of its ends connected to the rod C by a universal joint and having its other end extending to a position adjacent to the steering post D.

$C^4$, is a lever arm upon the rod C, carrying a gear wheel $C^5$ at its outer end adapted to engage the teeth of other gear wheels of the change speed gear to secure a backward or reverse movement. The lever arm $C^4$ is splined to the rod C so that when said rod is turned, the lever arm will be also turned to engage or disengage from the other gears, while the rod C is free to move longitudinally independent of said lever arm. The mechanism of this change speed gear is more particularly described in my application for Letters Patent now pending and numbered 224,057.

$C^a$, (Fig. 3) is a longitudinal groove in the surface of the rod C, and $C^b$, is an off-set groove from the groove $C^a$.

$C^c$, is a spring impelled pin extending into the groove $C^a$ or $C^b$. The pin $C^c$ prevents the rod C from turning except when said rod is in a position that brings said pin opposite the groove $C^b$.

D, is the steering post supported in a casting E, upon the frame A.

$D^1$, is a short outer sleeve upon the steering post D adapted to be turned by a handle $d^1$. The lever arm $B^{12}$, is also upon this sleeve. By turning the sleeve $D^1$ in one direction, the wire $B^8$ is drawn upon opening the passage through the carbureter, and loosening up on the wire $B^{10}$ permitting the spring $b^7$ to hold the valve $B^7$ in its closed position. By turning said sleeve in the other direction, the wire $B^8$ is slackened permitting the spring $B^9$ to nearly close the passage through the carbureter, throttling the engine, and drawing upon the wire $B^{10}$ to open the valve $B^7$ admitting compressed gas into the pipe $B^5$ and pneumatic apparatus $B^6$ and setting the brakes. Thus the engine is always throttled when the brake is set and the brake is always released when the throttle is open.

$B^{7f}$, is a segment of a disk upon the sleeve $D^1$; upon the lower surface of this segment are a number of indentations. $B^{7g}$, is a spring impelled pin upon the casting E adapted to engage in said indentations to mark the various positions of said segment corresponding to the different positions of the valve $B^7$.

$D^2$, is a sleeve bearing in the casting E, provided with a hand wheel $d^2$ at its upper end and a worm $D^{2a}$ at its lower end, which latter engages the quadrant 'not shown) of the steering gear in the well known way.

$D^3$, is a sleeve within the sleeve $D^2$ provided with a hand wheel $d^3$ at its upper end, and having an arm $C^3$ secured at its lower end. The outer end of the arm $C^3$ engages the rod $C^1$ with a ball and socket joint.

$E^1$, $E^1$, are parallel jaws extending from the casting E. By turning the sleeve $D^3$, the arm $C^3$ is turned with it, which actuates the rod $C^1$ forcing it backward or forward longitudinally, the rod $C^1$ carrying the rod C with it and shifting the change speed gear. At the position at which the pin $C^c$ is opposite the offset groove $C^b$, the arm $C^2$ extending from the rod $C^1$ and rigidly secured to said rod passes between the jaws $E^1$, $E^1$. If one wishes to drive backward, when the arm $C^2$ is between the jaws $E^1$, $E^1$, he raises up on the wheel $d^3$ raising it to the position shown in dotted lines; this carries the sleeve $D^3$ upward and with it the arm $C^3$, rod $C^1$, and the outer end of the arm $C^2$, the inner end of said arm being retained by the jaws $E^1$ thus turning the rod $C^1$ which carries with it the rod C and engages the reverse gear wheel $C^5$, as indicated in Fig. 4. The pin $C^c$ of course coming into the groove $C^b$. At this position the various gears are disengaged until joined by the gear wheel $C^5$.

$D^4$, is a sleeve passing through the sleeve $D^3$ and having a lever arm $D^{4a}$ at its lower end and an arm $d^{4a}$ at its upper end.

$D^{4b}$, is a metal strip mounted upon the arm $D^{4a}$ and normally making contact at its upper end to complete the primary circuit. By turning the handle $d^4$, the sleeve $D^4$ is turned carrying with it the arm $D^{4a}$, thus advancing or retarding the spark, in a way well known to those familiar with the art and therefore not more particularly described here. By raising the sleeve $D^4$ upward, the strip $D^{4b}$ is raised above its point of contact thus breaking the electric circuit.

$D^5$, is a rod pivoted in and extending through the sleeve $D^4$. The rod $D^5$ is adapted to actuate the mechanism for regulating the quality of the mixture.

What I claim is:—

1. The combination of a change speed mechanism having adjustable connections to secure different speed ratios and an adjustable connection to secure reverse motion, a rod adapted to slide longitudinally to shift the connections to secure different speed ratios and to rotate to actuate the adjustable connection to secure the reverse action, a second rod secured to the first rod so as to be free to change its position laterally, but restrained from rotation relative to the first mentioned rod, means for shifting the second rod laterally and longitudinally, said second rod being provided with a laterally extending arm, and means for restraining the motion of the outer end of said arm laterally to said rod whereby said rods are turned about their axis.

2. The combination of a change speed mechanism having adjustable connections to secure different speed ratios and an adjustable connection to secure reverse motion, a rod adapted to slide longitudinally to shift the connections to secure different speed ratios and to rotate to actuate the adjustable connection to secure the reverse motion, a second rod secured to the first rod so as to be free to change its position laterally, but restrained from rotation relative to the first mentioned rod, an arm extending laterally from said second rod, means for shifting said rods longitudinally, a lug located adjacent to a portion of the path of travel of said arm adapted to contact said arm, and means for shifting said second rod laterally when adjacent to said lug, for the purpose described.

3. The combination of a rod adapted to slide longitudinally, to rotate, and to move laterally, means for shifting said rod longitudinally and laterally, an arm extending laterally from said rod, and a stationary lug adjacent to a portion of the longitudinal path of said arm and adapted to contact said arm.

4. The combination of a rotatable and slidable part $D^3$, an arm $C^3$ extending from $D^3$, a rod $C^1$, the arm $C^3$ being secured to the rod $C^1$ so as to allow the latter an independent motion of rotation, an arm $C^2$ extending from the rod $C^1$, a stationary lug $E^1$, the arm $C^2$ being adapted to pass by the lug $E^1$, in its longitudinal movement, and to contact it in its lateral movement, for the purpose described.

5. In an automobile, the combination of a change speed mechanism having a reverse gear, a steering post, a part upon said steering post adapted to slide longitudinally thereof and to turn relative thereto, and means connecting said part with said change speed mechanism adapted to operate one part of said mechanism when said part is moved in one way and another part of said mechanism when said part is moved in the other way.

6. The combination of a part adapted to slide longitudinally, to rotate, to move laterally, means for shifting said part longitudinally and laterally, an arm extending laterally from said part, and means for restraining the lateral movement of the outer end of said arm.

7. In combination with mechanism adapted to operate in two ways, a part adapted to slide to arrange said mechanism to operate in one way and to rotate to arrange said mechanism to operate in another way, said part being also adapted in part to move laterally, and means whereby when said part is moved laterally it is thereby caused to rotate.

In testimony whereof, I sign this specification in presence of two witnesses.

CHARLES B. KING.

Witnesses:
T. G. MASSER,
ELLIOTT J. STODDARD.